United States Patent [19]

Pohl et al.

[11] 3,907,600

[45] Sept. 23, 1975

[54] ELECTRODE OF SELENIDES OR TELLURIDES

[75] Inventors: Franz Arthur Pohl, Gotzenhain; Harald Böhm, Oberursel, both of Germany

[73] Assignee: Licentia Patent-Verwaltungs G.m.b.H., Frankfurt, Germany

[22] Filed: June 9, 1970

[21] Appl. No.: 44,797

[30] Foreign Application Priority Data

June 9, 1967 Germany............................ 19291161

[52] U.S. Cl. ......... 136/121; 136/86 D; 136/120 FC
[51] Int. Cl. .......................................... H01m 13/02
[58] Field of Search.......... 136/120 R, 120 FC, 121, 136/86 D

[56] References Cited
UNITED STATES PATENTS

| | | | |
|---|---|---|---|
| 3,031,518 | 4/1962 | Werner et al..................... | 136/86 A |
| 3,223,556 | 12/1965 | Cohn et al. ........................... | 136/86 |
| 3,324,025 | 6/1967 | Hackerman...................... | 136/86 D |
| 3,380,856 | 4/1968 | Pohl............................... | 136/120 FC |
| 3,471,412 | 10/1969 | Miale et al......................... | 252/439 |

Primary Examiner—L. Dewayne Rutledge
Assistant Examiner—M. J. Andrews
Attorney, Agent, or Firm—Spencer & Kaye

[57] ABSTRACT

A fuel electrode whose catalytic component is chosen from the group consisting of the tellurides and selenides of the elements molybdenum, tungsten, and chromium.

3 Claims, 1 Drawing Figure

US Patent   Sept. 23, 1975   3,907,600
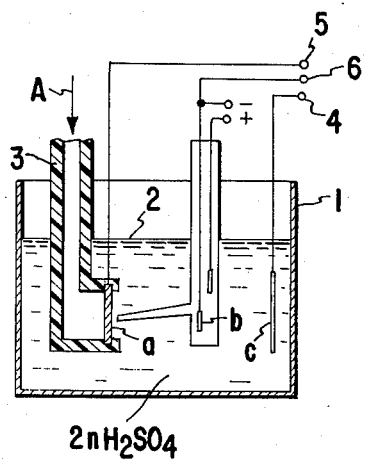
INVENTORS.
Franz Arther Pohl
Harald Böhm
BY *Spencer & Kaye*
ATTORNEYS.

ELECTRODE OF SELENIDES OR TELLURIDES

BACKGROUND OF THE INVENTION

The present invention relates to a fuel electrode for a fuel cell.

It is known to use electrocatalysts such as nickel and platinum for the electrochemical burning of fuels in fuel cells. The disadvantages of such known catalysts lie either in their being too valuable for commercial use, as in the case of platinum, or in their being poisoned by the fuel or by impurities contained in the fuel, whereby catalytic abilities are lost.

It has also already been proposed to use an electrode of tungsten carbide for the electrochemical oxidation of impure hydrogen using impure atmospheric oxygen.

SUMMARY OF THE INVENTION

An object of the present invention, therefore, is to provide a fuel electrode that not only gives a continued burning of impure, gaseous fuels, but in addition makes possible an electrochemical burning of dissolved fuels at high efficiency.

This as well as other objects which will become apparent in the discussion that follows are achieved, according to the present invention, by providing a fuel electrode containing one or more tellurides and/or selenides of the elements molybdenum, tungsten, or chromium.

In a further development of the present invention, the catalytic activity of the electrodes of the present invention is improved by the addition of a molybdenum and/or tungsten sulfide.

Surprisingly, it has been found that an electrocatalysts according to the invention can be used for the electrochemical conversion of gaseous fuels composed essentially of carbon monoxide, without experiencing degeneration of catalytic abilities. Thus, for example, gas obtained by reforming natural gas or liquid hydrocarbons can be oxidized in a conventional fuel cell using the catalysts of the present invention. Quite surprisingly such gases can be converted at high current density in a low temperature fuel cell, i.e. one operating at below 100°C.

Should the fuels contain hydrogen sulfide, elemental sulfur is a useful by-product obtained using the electrodes according to the present invention.

According to a preferred further development of the present invention, the electrode of the present invention is used for the electrochemical conversion of dissolved fuels such as alchohols, aldehydes, and carboxylic acids. It has been surprisingly found that the oxidation of formaldehyde or formic acid proceeds with an efficiency never before achieved.

BRIEF DESCRIPTION OF THE DRAWINGS

The sole FIGURE of the drawing is a partly schematic, elevational, cross-sectional view of a half-cell used for evaluating the electrode of the present invention.

DESCRIPTION OF THE PREFERRED EMBODIMENTS

The tellurides, selenides, and sulfides of the present invention have relatively small electrical conductivities, so it is preferred to mix them with additives having higher electrical conductivities when forming them into electrodes. Especially favorable for such purposes is hard coal or tungsten carbide in amounts of ten to 50 volume percent. Depending on whether the electrodes of the present invention are used for the electrochemical burning of gaseous or of dissolved fuels, they are either provided as gas-diffusion or as immersion electrodes.

The electrodes of the present invention are prepared by first pulverizing the raw materials and then mixing them with a thermoplastic material. The mixture is then pressed and finally sintered. Since immersion electrodes generally must have less porosity than gas diffusion electrodes and moreover must possess hydrophilic properties, it is preferred to use less plastic for their production. Suitable thermoplastic materials are polyethylene, polypropylene, polycarbonate, and halogenated polyolefins.

Further illustrative of the present invention are the following examples:

EXAMPLE I

The following powders are mixed:
50 volume-% $MoSe_2$ powder having a particle size of less than 1 micron;
30 volume-% conductive, porous hard coal having a particle size of 10 microns as supplied by Ringsdorffwerke, D-532 Bad Godesberg-Mehlem, Germany, under the name "EK 15" and
20 volume-% polyethylene of particles size range between 90 and 150 microns.

The above-mentioned hard coal has a resistivity of 6 × $10^{-3}$ ohm.centimeters and an ash content of 1.0 weight-%. This material is chosen as additive because its particles are porous, it is stable against corrosion, and has good electrical conductivity.

The mixture is compacted at a pressure of $0.55 \times 10^6$ ponds per $cm^2$ into a disc-shaped fuel electrode having a thickness of 2 millimeters and a diameter of 34 millimeters.

This electrode is sintered at 150°C for 30 minutes.

The thus made electrode is evaluated in the half-cell arrangement illustrated in the FIGURE of the drawing. Glass vessel 1 contains 2-normal sulfuric acid as electrolyte, which is indicated by water level 2. The electrode $a$ in the form of a disc as above prepared is sealed in the immersed end of a transparent, non-conductive, plastic tube 3 made, for instance, of Arylglas. Hydrogen reference electrode $b$ is constructed according to J. Giner, "A Practical Reference Electrode", *J. Electrochem. Soc.*, Volume 111 (1964), page 376. A carbon rod $c$ serves as counter-electrode. Such apparatus is described in "Wolframcarbid, ein Elektrokatalysator fur saure Brennstoffzellen" by Harald Bohm and Franz A. Pohl, *Wissenschaftliche Berichte AEG-Telefunken*, Vol. 41 (1968), pages 46–49, while similar apparatus is described in "Brennstoffelements" by Wolf Vielstich, Verlag Chemie 1965, pages 27–30.

Evaluation is carried out at an electrolyte temperature of 60°C. Carbon monoxide is caused to flow as fuel down tube 3, through disc $a$, at a pressure of 150 millimeters of water and a flow rate of around 2–5 liters/hr as measured at 25°C and one atmosphere pressure. When there is no current flowing between the electrode disc $a$ of this example and the counter-electrode $c$, a relatively low voltage of 30 millivolts is measured between the hydrogen reference electrode $b$ and the electrode disc $a$. When a current is introduced at terminals 4 and 5 to flow between counter-electrode $c$ and electrode disc $a$ with electron flow being from electrode $c$, through the electrolyte, to electrode $a$ to produce a current density on electrode $a$ of 9 milliamperes per cm$^2$, a reference voltage $U_H$ of 200 millivolts is measured across terminals 5 and 6. Once this current density is obtained at a certain voltage drop across terminals 4 and 5, it remains constant as time of operation increases.

EXAMPLE II

One proceeds as in Example I, except that instead of 50 volume-% MoSe$_2$, the mixture contains
   25 volume-% tungsten disulfide (WS$_2$) having a particle size of less than 1 micron; and
   25 volume-% tungsten telluride (WTe$_2$) having a particle size of less than 1 micron.

Formaldehyde is used as fuel, dissolved in the electrolyte at a 2-molar concentration, instead of the carbon monoxide of Example I. The resulting immersion electrode provides, under the experimental conditions set forth in Example I, at zero-current $U_H$ of 15 millivolts. With a current density of 12 milliamps per cm$^2$, $U_H = 200$ millivolts, electron flow being in the direction of Example I. Also in this example, no fall in current density is experienced with time. Tube 3 functions in this example only as a supporting means for the electrode $a$.

EXAMPLE III

One proceeds as in Example I, except that instead of 50 volume-% MoSe$_2$, the mixture contains
   50 volume-% tungsten diselenide (WSe$_2$) having a particle size of less than 1 micron.

Using hydrogen as fuel at a pressure of 150 millimeters H$_2$O, flow rate of 2–5 liters per hour, instead of the carbon monoxide of Example I, the resulting electrode $a$ provides, under the experimental conditions set forth in Example I, voltage $U_H$ of 200 millivolts at 38 milliamps per cm$^2$ current density.

EXAMPLE IV

One proceeds as in Example I, except that instead of 50 volume-% MoSe$_2$, the mixture contains
   25 volume-% molybdenum disulfide (MoS$_2$) having a particle size of less than 1 micron; and
   25 volume-% tungsten diselenide (WSe$_2$) having a particle size of less than 1 micron.

Using as fuel, instead of the carbon monoxide of Example I, a gas mixture containing 50 volume-% hydrogen, 25 volume-% carbon monoxide, and 25 volume-% hydrogen sulfide, at a pressure of 150 millimeters of water, this gas-diffusion electrode provides, under the experimental conditions set forth in Example I, a voltage $U_H$ of 200 millivolts at a current density of 42 milliamperes per cm$^2$. Also in this example, no fall in current density is experienced with time.

EXAMPLE V

An electrode is prepared as in Example I, except that instead of the 30 volume-% hard coal, the mixture contains
   30 volume-% tungsten carbide (WC) having a particle size of 2.5 microns.

EXAMPLE VI

Tungsten carbide (WC) of 2.5 micron particle size is suspended in water and sufficient ammonium selenotungstate is added to provide a tungsten carbide to tungsten diselenide (WSe$_2$) volume ratio of 30/50 in the final product. Then 6-normal hydrochloric acid is added until the moles of hydrochloric acid in the solution equal the moles of ammonuim ion. This causes tungsten triselenide to precipitate on the suspended tungsten carbide particles. The mixture is then filtered and dried. Upon heating at 350° to 450°C, the tungsten triselenide on the tungsten carbide is converted to tungsten diselenide.

One then proceeds to mix in the 20 volume-% polyethylene of Example I. Further details in the preparation of an electrode are the same as in Example I.

EXAMPLE VII

One proceeds as in Example VI, except that instead of the ammonium selenotungstate, ammonium selenomolybdate is used.

EXAMPLE VIII

One proceeds as in Example II, except that instead of formaldehyde as fuel, CH$_3$OH is used, dissolved in the electrolyte at a 2-molar concentration. At $U_H = 400$ millivolts, the current density is 0.8 milliamps per cm$^2$.

EXAMPLE IX

One proceeds as in Example II, except that instead of formaldehyde as fuel, formic acid is used, dissolved in the electrolyte at 2-molar concentration. At $U_H = 200$ millivolts, the current density is 6 milliamps per cm$^2$.

Electrochemical burning of fuels in no case led to an impairment of the activity of the electrode catalysts of the present invention.

Electrodes may be made of the tellurides of molybdenum and tungsten, chromium selenide, and chromium telluride analogously to the process given in Example I for MoSe$_2$.

It will be understood that the above description of the present invention is susceptible to various modifications, changes and adaptations, and the same are intended to be comprehended within the meaning and range of equivalents of the appended claims.

We claim:

1. An electrode consisting essentially of at least one compound selected from the group consisting of the tellurides and selenides of the elements molybdenum, tungsten and chromium, and further containing at least one compound selected from the group consisting of molybdenum sulfide and tungsten sulfide.

2. An electrode as claimed in claim 1, further containing means for increasing effective electrical conductivity.

3. An electrode as claimed in claim 2, said means being selected from the group consisting of hard coal and tungsten carbide.

* * * * *

UNITED STATES PATENT AND TRADEMARK OFFICE
CERTIFICATE OF CORRECTION

PATENT NO. : 3,907,600
DATED : September 23, 1975
INVENTOR(S) : Franz Arthur Pohl et al It is certified that error appears in the above—identified patent and that said Letters Patent are hereby corrected as shown below:

In the heading of the patent, under [30] Foreign Application Priority Data, change "1967" to --1969-- and change "19291161" to --1929161--.

Column 3, line 22, after "current" insert --an--.

Signed and Sealed this second Day of March 1976

[SEAL]

Attest:

RUTH C. MASON
*Attesting Officer*

C. MARSHALL DANN
*Commissioner of Patents and Trademarks*